Patented Nov. 11, 1947

2,430,553

UNITED STATES PATENT OFFICE 2,430,553

LECITHINATED SUGAR

Frank E. Bigelow, Hillsboro, Ill.

No Drawing. Application November 2, 1946,
Serial No. 707,519

10 Claims. (Cl. 99—15)

My invention relates to a mixture of a vegetable lecithin combined with an edible oil and sugar to produce a substance for use in an ice cream mixture, whereby such mixture is frozen more rapidly and is of a smoother texture, and whereby the mix may be more thoroughly emulsified; that is, the butterfat, sugar, and moisture are more completely emulsified together and in this thoroughly emulsified mix air is more easily incorporated during the process of freezing and whipping, which produces smaller air spaces equally distributed throughout the mass. These minute air spaces result in a larger continuous phase while freezing and whipping, which accelerates the transfer of heat from the ice cream mixture, thereby producing a more rapid freezing and whipping. I term my product "lecithinated sugar."

I have produced a product that can be finely ground and placed in containers from which it can be dipped by the operator in any convenient manner, and if desired can be weighed or otherwise measured before it is placed into the ice cream mixture.

Another feature of my invention is that while vegetable lecithin is highly hydroscopic, readily taking up moisture from the atmosphere, in my lecithinated sugar mixture the hydroscopic nature of the lecithin has been very greatly retarded.

For many years it has been known that by the addition of a small percentage of powdered egg yolk to an ice cream mix, said mix would freeze and whip in a much shorter time than a mix that did not contain egg yolk, and until relatively recently nearly all commercial ice cream manufacturers used powdered egg yolk in their ice cream mix for the above purpose, but such use was discontinued due to the high cost of powdered egg yolk, although some ice cream manufacturers still employ powdered egg yolk in spite of its high cost. The purpose of using powdered egg yolk was that it produced a better emulsification of the mixture and more rapid freezing and whipping, and a smoother quality in the frozen product. In the emulsification of the ice cream mixture, the air spaces were smaller and better distributed throughout the mass and the mass was permitted to expand more quickly and to discharge its heat in a more rapid manner during the process of freezing.

According to the process of the present invention, a free-flowing composition containing lecithin in substantial quantity is prepared which is adapted readily to be incorporated in ice cream by the ice cream manufacturer. Vegetable lecithin, as sold commercially, is thick, viscous composition even when a substantial quantity of oil is present, and an ice cream manufacturer encounters serious difficulty and nuisance in attempting to incorporate such a material in the ice cream mixture. However, the products of the present invention may be used conveniently to incorporate lecithin in the ice cream mixture in substantially the same manner as the ice cream manufacturer would introduce granulated sugar, and a result is obtained substantially the same as the result obtained in using powdered egg yolk. While sugar and lecithin comprise the primary components of the present products, they also may include cream, edible oil, milk and water, the latter being introduced and subsequently removed during processing, to facilitate the production of a material which is granular but which nevertheless contains a lecithin in substantial quantity. Briefly, the present invention is based upon the determination that only a limited amount of lecithin may be incorporated with sugar if the viscous, greasy lecithin is merely mixed or ground with the sugar component, but the products containing substantially greater quantities of lecithin may be prepared which display the desired free-flowing qualities if the process is employed in which a first dry mixture is obtained comprising lecithin and sugar with or without water, and if this dry mixture subsequently is added and commingled with a second mixture comprising lecithin and sugar with or without water prior to the drying and grinding of the final product.

One typical example of the process is as follows:

I take approximately 21 ounces by weight of a soy lecithin solution and combine the same with an equal amount of water and thoroughly mix the mass until the soy lecithin has completely absorbed all of the water. I then take this mixture, weighing approximately 42 ounces, and thoroughly mix it with approximately 14 pounds of sugar. When thoroughly mixed, it becomes a thick, heavy, glutinous, sticky mass that will almost spread itself on a flat surface. This mass is then spread on waxed paper on trays and placed in a suitable dryer and dried at approximately 110° to 120° F. until it is sufficiently dry to be ground to a fine powder. This takes from 12 to 16 hours in the dryer. This powder is known as the prime or master mix.

I next take approximately 21 ounces by weight of a soy lecithin solution and combine the same with an equal amount of water and thoroughly mix such mass until the soy lecithin has absorbed all of the water. I then take this mixture and combine it with approximately 14 pounds of sugar until it becomes a thick, sticky mass. I then add approximately 20 percent to 25 percent by weight of the prime or master mix to this mixture and thoroughly mix the same until it becomes crumbly so that it can be placed on wire trays and then dried in a suitable dryer at a temperature of 110° to 130° F. for a period ranging from 12 to 16 hours, when the same is sufficiently dry to permit grinding to a fine powder. In this powdered condition, it will not spoil, mould, or become rancid.

In the manufacture of ice cream approximately ½ pound of my lecithinated sugar is added to 100 pounds of ice cream mix, and this can be done at any time during the process of pasteurizing the mix (if this is done), or it can be mixed with the ice cream mix prior to freezing.

The lecithinated sugar which I have produced as above set forth can be conveniently shipped and stored, and kept in dry storage for an indefinite period.

Soy lecithin, that is, lecithin derived from soy bean oil, is the preferred material to be used in the practice of the present process since it is readily available at relatively low price, however, the term "lecithin" as used throughout the specification and claims is intended to include not only lecithin per se, such as may be derived from soy bean oil, but other compositions consisting of lecithin, cephalin, or other phospholipids commonly associated therewith, preferably in a suitable carrier such as a vegetable oil.

According to the example previously given, lecithin and water are first commingled with one another and then this mixture is commingled with the sugar in the preparation of the respective batches which subsequently are associated with one another. However, it is not absolutely essential that the lecithin and water be first mixed with one another before the sugar is incorporated. Thus, a variation of the process comprises adding water to the sugar in amount sufficient to render it receptive to the lecithin and subsequently adding lecithin to this receptive mixture. A typical example of the modified product is as follows: Water and sugar are commingled with one another in the proportion of 40 parts of sugar to 4 parts of water by weight, whereby a thick, heavy magma is obtained. Lecithin is then added to this admixture in the proportion of approximately 6 parts of lecithin by weight to 44 parts by weight of the water-sugar mixture. Stirring is continued until the composition of the mass is uniform. In this condition, the mass is sticky, but it is next dried at elevated temperature as previously described until it is sufficiently hard to be ground and this dried mass is then ground. A second batch of material is next prepared in the same manner as the first batch was produced before drying and grinding and in substantially the same proportions, and the dried and ground first batch is then admixed with the undried and sticky batch in the proportion of approximately one part of the dried and ground first batch to approximately 3 to 9 parts of the sticky second batch. These materials are commingled whereby a composition of crumbly consistency is obtained. This crumbly mass is then dried, as previously described, and finally it is ground to produce a final product of granular, free-flowing consistency.

The process disclosed herein enables 10% or more by weight of lecithin to be incorporated in the sugar without impairing the free-flowing qualities of the final product. This characteristic enables suitable amounts of lecithin to be incorporated in an ice cream mix without excessive quantities of sugar.

This application is a continuation in part of my previous application, Serial No. 522,965, filed February 18, 1944, for "Lecithinated sugar."

Having described my invention, I claim:

1. The method of preparing a dry, free-flowing food product, comprising, preparing a first batch of material by admixing soy lecithin containing vegetable oil, and water, in substantially equal proportions until a mixture of uniform consistency is obtained, commingling sugar with said admixture in the proportion of approximately 42 parts of admixture to 224 parts of sugar and thereby obtaining a thick, sticky mass, drying this mass at elevated temperature until it is sufficiently hard to be ground, and subsequently grinding this mass, preparing a second batch of material, comprised of soy lecithin, water and sugar, in the same manner that the first batch was produced before drying and grinding, and in substantially the same proportions, and then commingling the dried and ground first batch with the sticky second batch, in the proportion of approximately one part of the dried and ground first batch to three to four parts of the sticky second batch, all parts and proportions being by weight, and commingling the batches until a mass is obtained of a crumbly consistency, then drying the crumbly mass, and finally grinding it until it is of granular, free-flowing consistency.

2. The method of preparing a dry, free-flowing food product, comprising, preparing a first batch of material by admixing soy lecithin containing vegetable oil, and water, in substantially equal proportions until a mixture of uniform consistency is obtained, commingling sugar with said admixture in the proportion of approximately 42 parts of admixture to 224 parts of sugar and thereby obtaining a thick, sticky mass, drying this mass at elevated temperature until it is sufficiently hard to be ground, and subsequently grinding this mass, preparing a second batch of material, comprised of soy lecithin, water and sugar, in the same manner that the first batch was produced before drying and grinding, and in substantially the same proportions, and then commingling the dried and ground first batch with the sticky second batch, in the proportion of approximately one part of the dried and ground first batch to three to four parts of the sticky second batch, all parts and proportions being by weight, and commingling the batches until a mass is obtained of a crumbling consistency, then drying the crumbly mass at a temperature of approximately 110 to 130° F. for a period of approximately 12 to 16 hours, and finally grinding it until it is of granular, free-flowing consistency.

3. The method of preparing a dry, free-flowing food product, comprising, preparing a first batch of material by admixing soy lecithin containing vegetable oil and a substantially equal amount of a liquid of the class consisting of water and lacteal fluids, until a liquid admixture of uniform consistency is obtained, commingling sugar with said liquid admixture in the proportion of approximately 42 parts of liquid admixture to 224 parts of sugar and thereby obtaining a thick, sticky mass, drying this mass at elevated temperature until it is sufficiently hard to be ground, and subsequently grinding this mass, preparing a second batch of material comprised of soy lecithin, liquid admixture and sugar, in the same manner that the first batch was produced before drying and grinding, and in substantially the same proportions, then commingling the dried and ground first batch with the sticky second batch, in the proportion of approximately one part of the dried and ground batch to each three to four parts of the sticky second batch, all parts and proportions being by weight, and commingling the batches until a mass is obtained of a crumbly consistency, then drying the crumbly mass and finally grinding it until it is of granular, free-flowing consistency.

4. The method of preparing a dry, free-flowing food product, comprising, admixing soy lecithin containing vegetable oil with a substantially equal proportion of a liquid selected from the class consisting of water and lacteal fluids, until a mixture of uniform consistency is obtained, commingling sugar with said mixture, in the proportion of approximately 42 parts of admixture to approximately 224 parts of sugar and continuing said commingling until a thick, sticky mass is obtained, drying this mass and subsequently grinding it, then admixing this mass with a mass of the same ingredients in substantially the same proportions which has not been ground and dried, in the proportion of approximately 20% to 25% of dried ground mass to 80% to 75% of thick, sticky mass, all parts and proportions being by weight, thereby producing a crumbly mass, drying the crumbly mass at a temperature of approximately 110 to 130° F. for approximately 12 to 16 hours and then grinding it to produce a free-flowing powdery material.

5. The method of preparing a dry, free-flowing food product, comprising, preparing a first batch of material by admixing lecithin containing an oily carrier, and water, in substantially equal proportions until a mixture of uniform consistency is obtained, commingling sugar with said admixture in the proportion of approximately 42 parts of admixture to 224 parts of sugar and thereby obtaining a thick, sticky mass, drying this mass at elevated temperature until it is sufficiently hard to be ground, and subsequently grinding this mass, preparing a second batch of material, comprised of lecithin, water and sugar, in the same manner that the first batch was produced before drying and grinding, and in substantially the same proportions, and then commingling the dried and ground first batch with the sticky second batch, in the proportion of approximately one part of the dried and ground first batch to three to four parts of the sticky second batch, all parts and proportions being by weight, and commingling the batches until a mass is obtained of a crumbly consistency, then drying the crumbly mass, and finally grinding it until it is of granular, free-flowing consistency.

6. The method of preparing a dry, free-flowing food product, comprising, preparing a first batch of material by admixing lecithin containing an oily carrier and water, in substantially equal proportions until a mixture of uniform consistency is obtained, commingling sugar with said admixture in the proportion of approximately 42 parts of admixture to 224 parts of sugar and thereby obtaining a thick, sticky mass, drying this mass at elevated temperature until it is sufficiently hard to be ground, and subsequently grinding this mass, preparing a second batch of material, comprised of lecithin, water and sugar, in the same manner that the first batch was produced before drying and grinding, and in substantially the same proportions, and then commingling the dried and ground first batch with the sticky second batch, in the proportion of approximately one part of the dried and ground first batch to three to four parts of the sticky second batch, all parts and proportions being by weight, and commingling the batches until a mass is obtained of a crumbly consistency, then drying the crumbly mass at a temperature of approximately 110 to 130° F. for a period of approximately 12 to 16 hours, and finally grinding it until it is of granular, free-flowing consistency.

7. The method of preparing a dry, free-flowing food product, comprising, preparing a first batch of material by admixing lecithin containing vegetable oil and a substantially equal amount of a liquid of the class consisting of water and lacteal fluids, until a liquid admixture of uniform consistency is obtained, commingling sugar with said liquid admixture in the proportion of approximately 42 parts of liquid admixture to 224 parts of sugar and thereby obtaining a thick, sticky mass, drying this mass at elevated temperature until it is sufficiently hard to be ground, and subsequently grinding this mass, preparing a second batch of material comprised of lecithin, liquid admixture and sugar, in the same manner that the first batch was produced before drying and grinding, and in substantially the same proportions, then commingling the dried and ground first batch with the sticky second batch, in the proportion of approximately one part of the dried and ground batch to each three to four parts of the sticky second batch, all parts and proportions being by weight, and commingling the batches until a mass is obtained of a crumbly consistency, then drying the crumbly mass and finally grinding it until it is of granular, free-flowing consistency.

8. The method of preparing a dry, free-flowing food product, comprising, admixing lecithin with a substantially equal proportion of a liquid selected from the class consisting of water and lacteal fluids, until a mixture of uniform consistency is obtained, commingling sugar with said mixture, in the proportion of approximately 42 parts of admixture to approximately 224 parts of sugar and continuing said commingling until a thick, sticky mass is obtained, drying this mass and subsequently grinding it, then admixing this mass with a mass of the same ingredients in substantially the same proportions which has not been ground and dried, in the proportion of approximately 20% to 25% of dried ground mass to 80% to 75% of thick, sticky mass, all parts and proportions being by weight, thereby producing a crumbly mass, drying the crumbly mass at a temperature of approximately 110 to 130° F. for approximately 12 to 16 hours, and then grinding it to produce a free-flowing powdery material.

9. A method of preparing a dried, free-flowing food product which method comprises forming a composition of uniform consistency containing approximately 40 parts by weight of sugar, 4 parts by weight of water and 6 parts by weight of lecithin, drying this composition at elevated temperature until it is sufficiently hard to be ground and subsequently grinding the dried mass, forming a second batch of material containing lecithin, water and sugar in substantially the same proportions as the first batch before drying, then commingling the dried and ground first batch material with the sticky, undried material of the second batch in the proportion of approximately one part of the dried and ground first batch to three to nine parts of the sticky, second batch, commingling the materials of the respective batches until a mass is obtained which is of crumbly consistency, then drying the crumbly mass at elevated temperature, and finally, grinding it until it is of uniform free-flowing granular consistency.

10. A method of preparing a dry, free-flowing food product which method comprises forming a sticky mixture which is of substantially uniform consistency comprising sugar, lecithin, and water, drying this sticky mixture to remove water therefrom until it is grindable, and finally grinding the dried mixture, forming a second mixture like the first one before drying, and then adding one part of the dried and ground first mixture to three to nine parts by weight of the second mixture, and drying the whole mass and finally grinding it, the total amount of lecithin being adjusted in the respective mixtures such that the total amount in the final product is not substantially less than 10% by weight of the total.

FRANK E. BIGELOW.